US005650838A

United States Patent [19]

Roffman et al.

[11] Patent Number: 5,650,838

[45] Date of Patent: Jul. 22, 1997

[54] PROGRAMMABLE SMOOTH JUNCTIONS ON LENSES

[75] Inventors: Jeffrey H. Roffman; Timothy A. Clutterbuck, both of Jacksonville; Yulin X. Lewis, Ponte Vedra Beach, all of Fla.

[73] Assignee: Johnson & Johnson Vision Products, Inc., Jacksonville, Fla.

[21] Appl. No.: 433,739

[22] Filed: May 4, 1995

[51] Int. Cl.[6] ........ G02C 7/02

[52] U.S. Cl. ........ 351/177; 351/176

[58] Field of Search ........ 351/177, 161, 351/169, 171, 176

[56] References Cited

U.S. PATENT DOCUMENTS

| | | | |
|---|---|---|---|
| 3,822,089 | 7/1974 | Wichterle | 351/160 R |
| 3,944,347 | 3/1976 | Barkdoll et al. | 351/160 R |
| 3,973,837 | 8/1976 | Page | 351/160 R |
| 4,055,379 | 10/1977 | Winthrop | 351/169 |
| 4,095,878 | 6/1978 | Fanti | 351/161 |
| 4,121,885 | 10/1978 | Erickson et al. | 351/177 |
| 4,606,622 | 8/1986 | Fueter et al. | 351/177 |
| 4,676,610 | 6/1987 | Barkan et al. | 351/177 |
| 4,936,672 | 6/1990 | Capez | 351/161 |
| 5,112,351 | 5/1992 | Christie et al. | 351/161 |
| 5,166,711 | 11/1992 | Portney | 351/161 |
| 5,446,508 | 8/1995 | Kitchen | 351/169 |

FOREIGN PATENT DOCUMENTS 2096706 11/1994 Canada .

*Primary Examiner*—Georgia Y. Epps
*Assistant Examiner*—Jordan M. Schwartz

[57] ABSTRACT

Programmable smooth junctions are provided for lenses and molds therefor, particularly for toric lens designs, which enable a numerically controlled (NC) machine to be programmed to machine smooth junctions or transitions between adjacent regions of a lens which have different thicknesses or radii of curvature. First and second mathematical functions f(a) and f(b) are defined which specify the curves of first and second segments of a lens surface. The slope dy/dx is derived of the first and second mathematical functions f(a) and f(b) at the transition between the first and second segments of the lens surface. A mathematical function is defined which describes a desired transition between the first and second segments of the lens. The first and second mathematical functions f(a) and f(b), the derived slopes dy/dx of the first and second mathematical functions f(a) and f(b), and the mathematical function describing the desired transition are then utilized to program a numerically controlled machine to machine the first and second segments of the lens surface and the desired transition between the first and second segments.

13 Claims, 4 Drawing Sheets

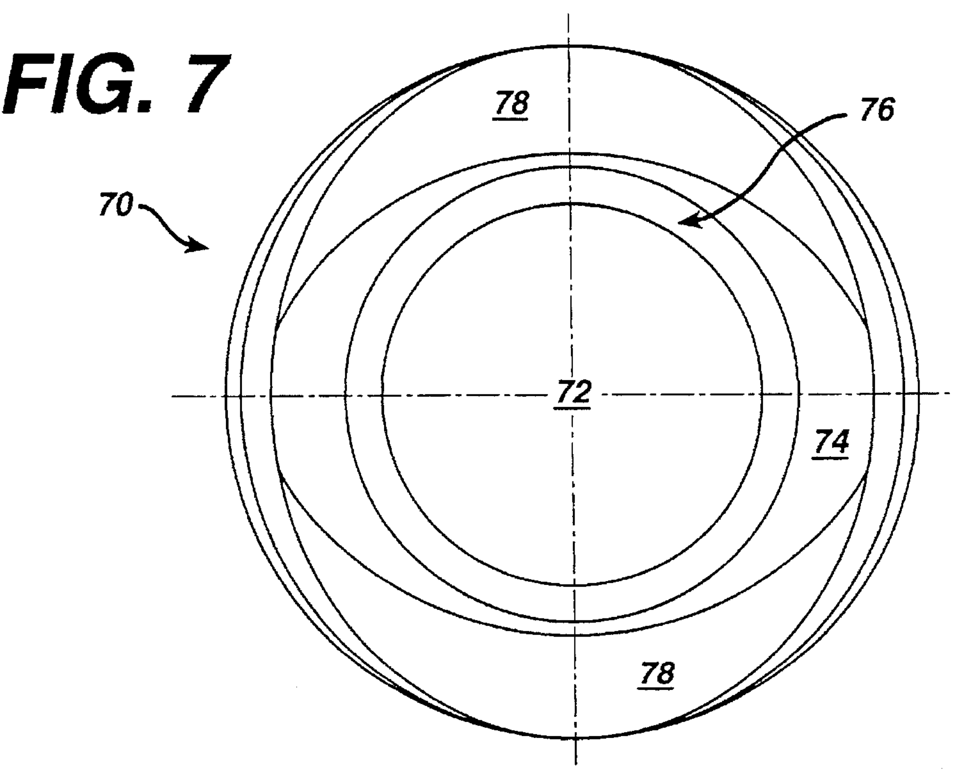
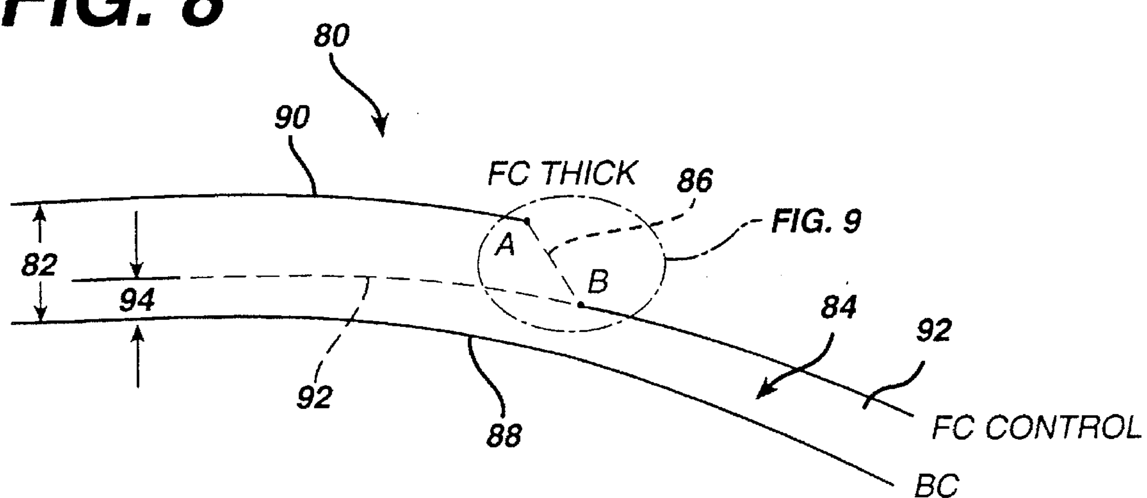
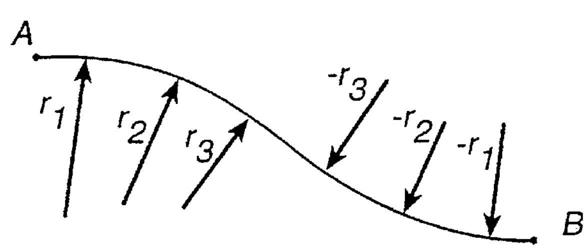
MULTIPLE RADII
WITH REVERSE CURVE

PROGRAMMABLE SMOOTH JUNCTIONS ON LENSES

BACKGROUND OF THE INVENTION

1. Field of the Invention

The present invention relates generally to programmable smooth junctions on lenses and molds therefor, particularly for toric lens designs. More particularly, the subject invention pertains to the designs of lenses and also the molds therefor, particularly for toric lens designs, which enable a numerically controlled (NC) machine to be programmed to machine smooth junctions or transitions between adjacent regions of the lens which have different thicknesses or radii of curvature. The subject invention provides precise numerically defined, smooth, near tangential transitions between adjacent regions of a contact lens of different thickness or radius and also of the mold therefor.

2. Discussion of the Prior Art

Fanti U.S. Pat. 4,095,878 discusses automatic orientation but does not discuss transition zones.

SUMMARY OF THE INVENTION

Accordingly, it is a primary object of the present invention to provide programmable smooth junctions on lenses and molds therefor, particularly for toric lens designs. More particularly, the subject invention provides the design of a lens and also a mold therefor, particularly for toric lens designs, which enables a numerically controlled (NC) machine to be programmed to machine smooth, near tangential junctions or transitions between adjacent regions of the lens which have different thicknesses or radii of curvature.

A further object of the subject invention is the provision of a precise, numerically defined and numerically controlled (NC) machinable, smooth near tangential transition between adjacent regions on a contact lens of different thickness or radius.

In accordance with the teachings herein, the present invention provides a method of designing a lens which enables a numerically controlled machine to be programmed to machine smooth transitions between adjacent regions of the lens which have different thicknesses or radii of curvature. The method defines first and second mathematical functions f(a) and f(b) which specify the curves of first and second segments of the lens surface. The slope dy/dx is derived of the first and second mathematical functions at the endpoints of the first and second segments of the lens surface. A mathematical function is defined which describes a desired transition between the first and second segments of the lens. The first and second mathematical functions f(a) and f(b), the derived slopes dy/dx of the first and second mathematical functions f(a) and f(b), and the mathematical function describing the desired transition are then utilized to program a numerically controlled machine to machine the first and second segments of the lens surface and the desired transition between the first and second segments.

In greater detail, the x and y intervals between the two functions f(a) and f(b) are scaled to $\pm 1$ based on the midpoint between the first and second segments of the lens surface. The mathematical function describing the transition can describe a linear function, a single bridge radius, multiple radii, an aspheric radius, multiple aspheric radii, mixed multiple spheric and aspheric radii, or multiple radii with a reverse curve. The present invention also pertains to a contact lens, such as a contact lens having a toric surface, produced according to the method herein.

BRIEF DESCRIPTION OF THE DRAWINGS

The foregoing objects and advantages of the present invention for programmable smooth junctions on lenses may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 7 is a plan view of a contact lens designed pursuant to the teachings of the present invention wherein a central optic zone of the lens is connected to a lenticular (nonoptical) zone of the lens by a transition curve or zone pursuant to the present invention;

FIG. 8 illustrates a further example of a contact lens designed pursuant to the present invention wherein a thicker central optical zone of the contact lens is connected to a thinner peripheral lenticular (nonoptical) zone of the contact lens with a transition curve pursuant to the present invention; and FIG. 9 is an enlarged view of one possible transition curve for the lens of FIG. 8 having multiple radii with a reverse curve.

DETAILED DESCRIPTION OF THE DRAWINGS

Figure 1:
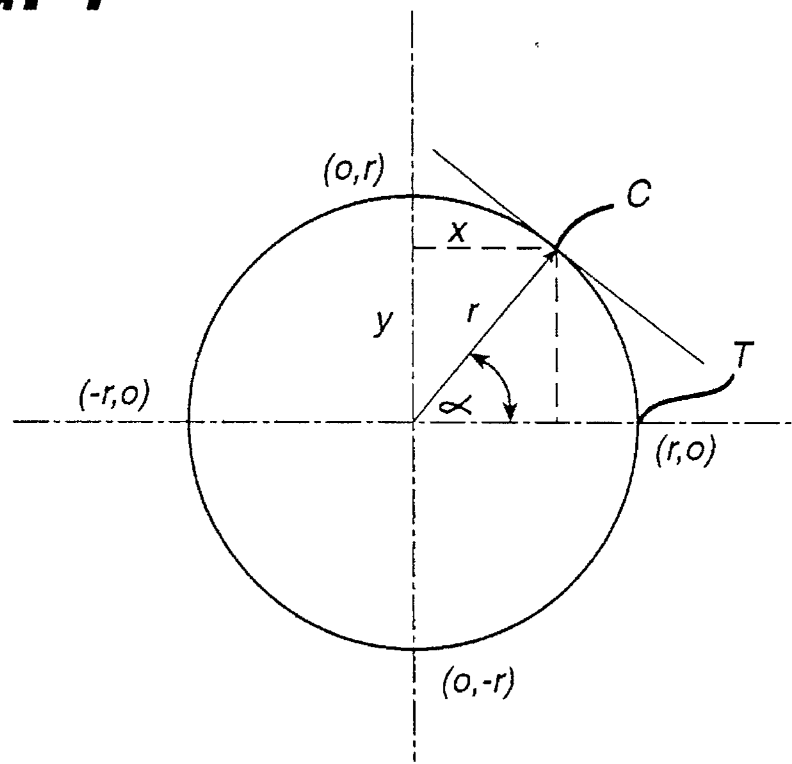
FIG. 1 illustrates the trigonometric relationships of the slope of a curve to a general x, y cartesian coordinate system.

Referring to the drawings in detail, FIG. 1 illustrates the trigonometric relationships of the slope of a curve to a general x, y cartesian coordinate system, and in particular, illustrates a circle with a radius r, and a semichord x which intersects the circle at tangential point c. If a vertical is dropped at tangential point c to translate x to the x axis, then the slope of the angle between the normal to the circle at tangential point c and the x axis is as follows, wherein $\alpha$ is the angle of the normal at point c.

$$\alpha = \cos^{-1}\frac{x}{r}$$

m⊥ is the slope of the normal at point c.

$$m_{\perp} = \tan\alpha = \frac{y}{x}$$

The slope of the tangent T is $$mT = \tan\left(\cos^{-1}\frac{x}{r} + \frac{\pi}{2}\right).$$

Figure 2:
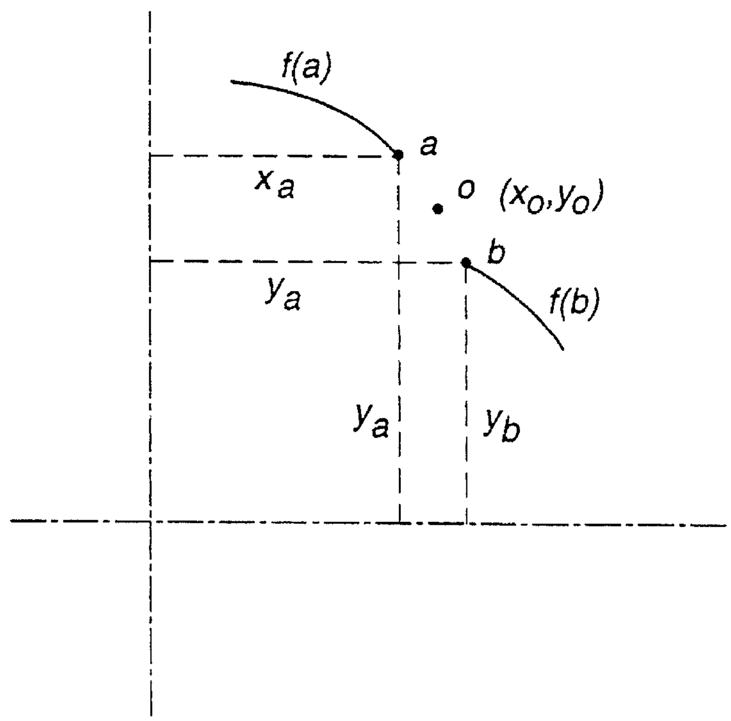
FIG. 2 illustrates, in an x, y cartesian coordinate system, a general problem approached by the present invention, wherein a first function f(a) defines the curve of a first segment of a lens surface and a second function f(b) defines the curve of a second segment of a lens surface, and the present invention provides a smooth, near tangential correction factor or transition between the first and second functions which can be used to program a numerically controlled machine to machine the first and second functions and the transition.

FIG. 2 illustrates, in an x, y cartesian coordinate system, a general problem approached by the present invention, wherein a first function f(a) defines the curve of a first segment of a lens surface and a second function f(b) defines the curve of a second segment of a lens surface, and the present invention defines a smooth, near tangential correction factor or transition between the first and second functions which can be used to program a numerically controlled machine to machine the first and second functions and the transition. The functions f(a) and f(b) can be any conic function, particularly for toric lens designs.

A general conic equation which describes all conics, including spheres, parabolas, ellipses and hyperbola is:

$$y = \frac{x^2}{r + \sqrt{r^2 - (k+1)x^2}}$$

where k=0 for a sphere,
k=−1 for a parabola,
0>k>−1 for an ellipse,
k<−1 for a hyperbola.

For the first quadrant, $$\frac{dy}{dx} = \frac{x}{\sqrt{r^2 - kx^2}}$$

and similar equations cover the remaining second, third and fourth quadrants.

Accordingly, for the example illustrated in FIG. 2, the slope dy/dx of each of the two curves f(a) and f(b) at the endpoints of the two curves (at point a for function f(a) and at point b for function f(b)) can be described mathematically. Then the two curves are connected by mathematically describing a function connecting the two known slopes, such that a numerically controlled diamond tipped milling machine can machine the smooth transition in a mold for the lens.

Referring to FIG. 2 the slope $$\frac{dy_a}{dx_a}$$

at $x_a y_a$ can be described mathematically with the above equation, and the slope $$\frac{dy_b}{dx_b}$$

at $x_b y_b$ can also be described mathematically with the above equation.

FIG. 2 shows the connecting points. Any of several connection functions, and possibly connection functions modified by a correction factor can be used to connect the two points a and b. The connection functions can be a power function, an asymptotic function, or a trigonometric function. In addition, any of these connection functions can be modified by a correction factor such as a linear correction factor, a v-shaped correction factor, an arc correction factor, or a conic correction factor. Accordingly, a selected connection function connecting the two known curves is defined by an equation mathematically specifying the connection function.

Figure 4:
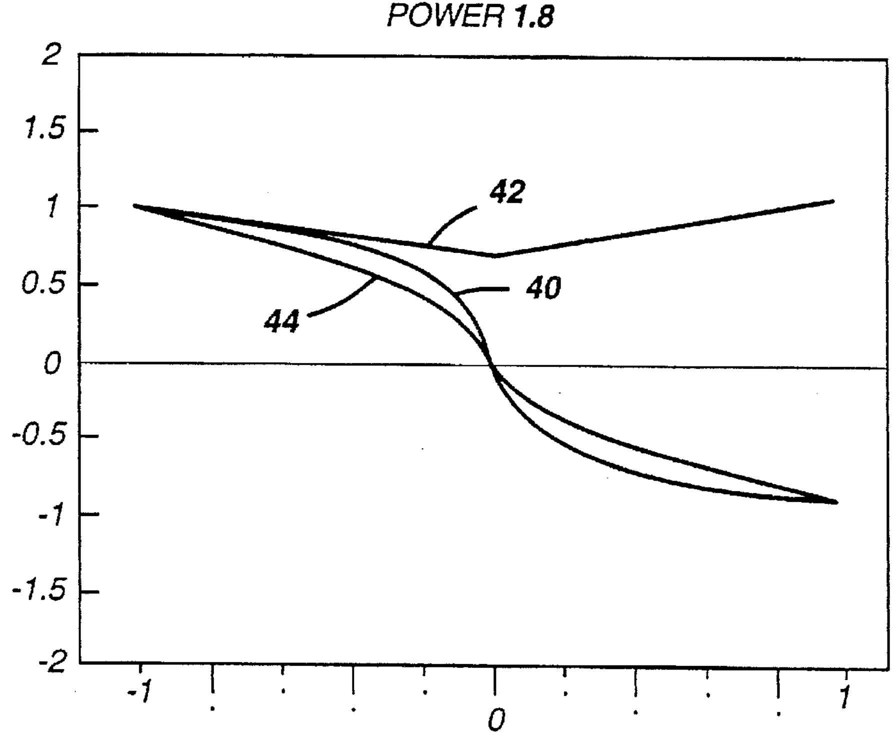
FIG. 4 illustrates curves of a power function, a correction factor, and the combined power function and correction factor.

For a power function with a slope down, as illustrated by the example in FIG. 4, for $$x \leqq 0,\ y = |x| \wedge^{(1/P)}$$

$$x > 0,\ y = -|x| \wedge^{(1/P)}$$

wherein P is the power.

Similarly, for a power function with a slope up, which is opposite to the illustration of FIG. 4, for $$x \leqq 0,\ y = -|x| \wedge^{(1/P)}$$

$$x > 0, y = |x| \wedge^{(1/P)}$$

In these equations, the x interval between the two functions f(a) and f(b) can be scaled to, ±1, where $x_o$ is the x coordinate midpoint of the gap, as illustrated in FIG. 2.

The variable y is self-scaled to ±1 by the equation for the power function since lim f(x)=±1 as x→±1.

For a power function, the function at any point is $$f(x) = \frac{(\pm)\,|x| \wedge^{(1/P)}}{c}$$

wherein c is the correction factor in the gap, such that the slope of the power function dy/dx at any point is $$\frac{dy}{dx} = \frac{(\pm)\,|x|^{1/P}}{cpx}$$

where x and y have been scaled to ±1 at any point.

Thus, referring to FIG. 2, the connection function between the known functions f(a) and f(b) is defined by an equation wherein x and y have been scaled to ±1.

For the points a, b and o in FIG. 2, $$x_o = x_a + \frac{(x_b - x_a)}{2}$$

$$y_o = \frac{y_b - y_a}{2}$$

For a linear correction factor $$y = mx + b$$

For an aspheric correction factor, the previous conic equation can be used, namely $$y=\frac{x^2}{r+\sqrt{r^2-(k+1)x^2}}$$

where k=0 for a sphere, k=−1 for a parabola,

0>k>−1 for an ellipse, k>−1 for a hyperbola.

For an asymmetrical correction function, the asymmetrical function is described by the appropriate mathematical function, such that the numerically controlled machine can follow the mathematical function.

For an asymptotic connection function equation, $$y=\frac{\pm x\sqrt{2}}{\sqrt{x^Q+1}}$$

with

+ for slope up, and

− for slope down where

Q=0 or 2 or 4 if Q=0 line if Q=2 the start and stop slopes are .−5 if Q=4 the start and stop slopes are 0

The slope of the asymptotic function is $$\frac{dy}{dx}=\frac{\sqrt{2}}{\sqrt{x^Q+1}}-\frac{\sqrt{2}\,Qx^Q}{2\,(x^Q+1)^{3/2}}$$

for a correction function c $$y_{corr}=\frac{y}{c}$$

The corrected asymptotic function then becomes $$f(x)=\frac{\frac{\pm x\sqrt{2}}{\sqrt{x^Q+1}}}{c}$$

and the slope of the corrected asymptotic equation simplified, $$\frac{dy}{dx}=\frac{\sqrt{2}}{c\sqrt{x^Q+1}}-\frac{\sqrt{2}\,Qx^Q}{2c\,(x^Q+1)^{3/2}}$$

Figure 3:
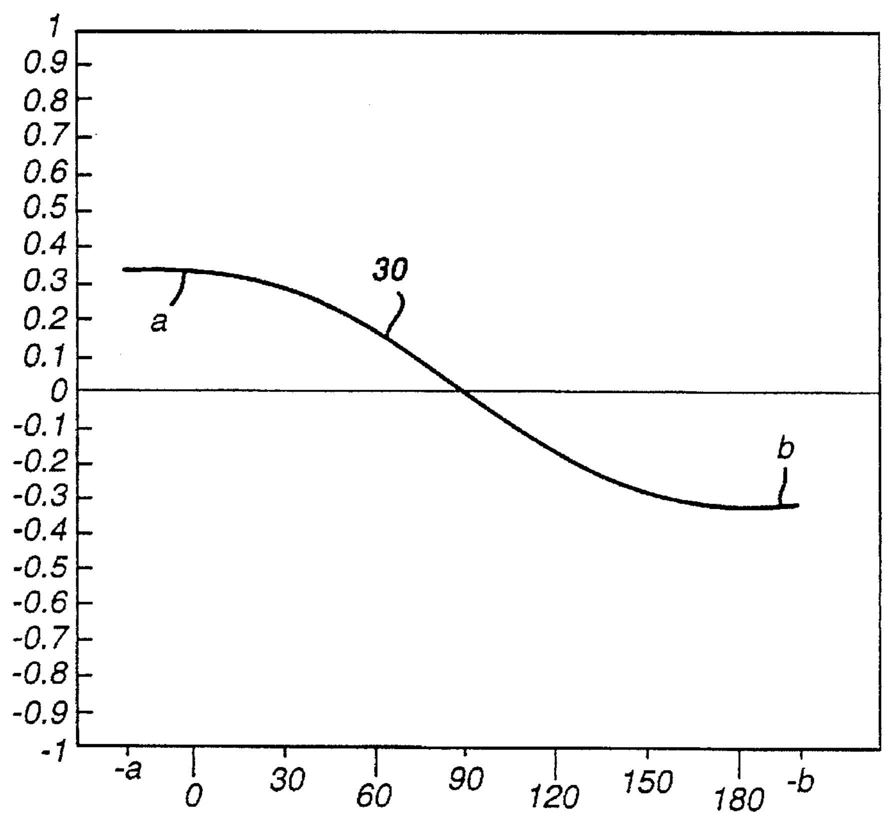
FIG. 3 illustrates a curve of a lens surface having a first segment defining a first lens power and a second segment defining a second lens power, and wherein a transition curve generated pursuant to the present invention connects the first and second segments.

FIG. 3 illustrates a curve of a lens surface wherein a first segment defining a first lens power ends at point a, a second segment defining a second lens power ends at point b, and a transition curve 30 generated pursuant to the present invention connects the first and second power surfaces.

FIG. 4 illustrates an example of a power function of 1.8, and illustrates curves of the power function 40, a correction factor 42, and the power function and correction factor combined 44.

Figure 5:
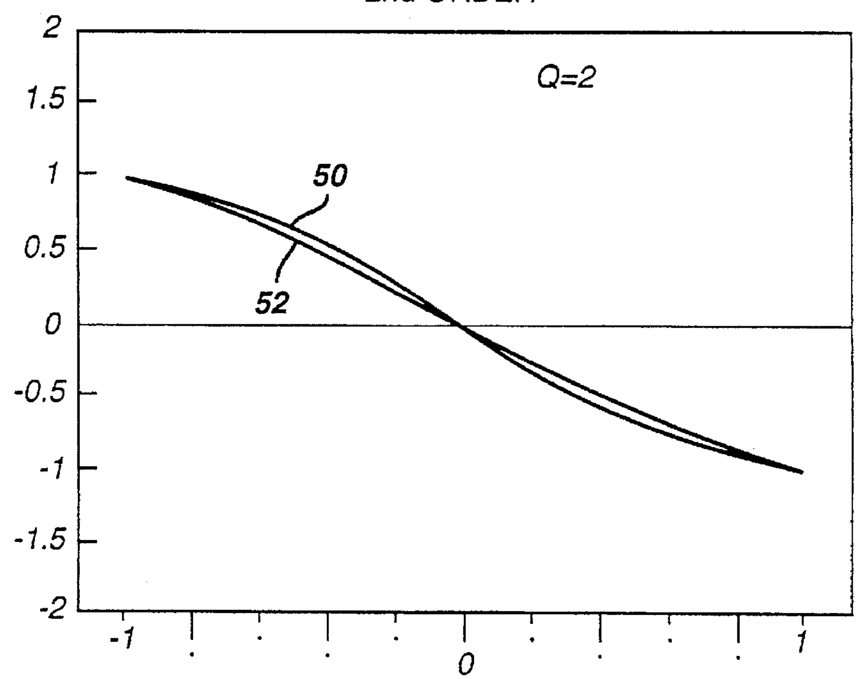
FIG. 5 illustrates a second order asymptotic function and a second order asymptotic function modified pursuant to the present invention.

FIG. 5 illustrates a second order asymptotic function 50 (wherein Q=2 in the above equation) and a second order asymptotic function 52 modified pursuant to the present invention.

Figure 6:
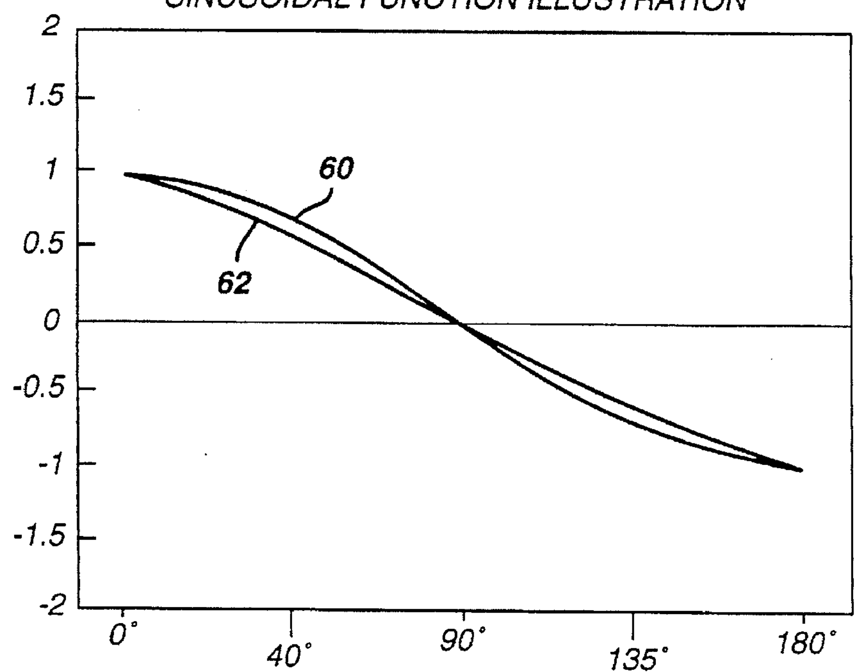
FIG. 6 illustrates a sinusoidal function and a sinusoidal function modified pursuant to the present invention.

FIG. 6 illustrates a sinusoidal function 60 and a sinusoidal function 62 modified pursuant to the present invention.

The present invention provides intermediate transition zone functions to maintain a smooth surface profile on lens surfaces such as contact lens surfaces, particularly toric contact lens surfaces, thus giving a uniform repeatable fit throughout the power range. The design accounts for a variable optic zone junction thickness with a constant lenticular junction thickness.

The optic zone junction thickness, herein defined as the radial lens thickness at the edge of the front optic zone, varies with designed lens power. This is generally of no consequence in an ordinary symmetrical (rotational) design. However, for rotationally stabilized designs, such as are used in torics, there is a requirement for consistent and repeatable fits across a broad power range. The present invention addresses this by allowing the stabilization system to maintain constant aspect/thickness ratios (the ratio between the vertical thickness and the horizontal thickness), and for a smooth transition between the required thick central optic zone, and the peripheral curves/stabilization system (quantify the slab off zone). The curves pursuant to the present invention can be placed on the front or back surface of the lens, as required, but are preferably placed on the front surface.

FIG. 7 is a plan view of a toric contact lens 70 having a transition zone 76 designed pursuant to the teachings of the present invention. In this exemplary embodiment, a central optic zone 72 of the lens having a toric surface is connected to a lenticular (nonoptical) zone 74 of the lens by a transition curve or zone 76 pursuant to the present invention. The lens includes upper and lower slab off areas 78 in the lenticular zone to provide eyelid induced rotational and positional stabilization of the toric lens.

The present invention can provide contact lens designs with a thinner peripheral region and a thicker central region, and can provide a unitary one-piece design for a hydrogel contact lens with a thicker and stiffer central region smoothly connected to a thin periphery region for use with an astigmatic patient.

FIG. 8 illustrates a further example of a contact lens 80 for an astigmatic patient designed pursuant to the present invention wherein a thicker central optical zone 82 of the contact lens is connected to a thinner peripheral lenticular (nonoptical) zone 84 of the contact lens with a transition curve 86 pursuant to the present invention. The contact lens 80 includes a lens back curve 88, an optical zone front curve 90, a control front curve 92, and a control center thickness 94.

FIG. 9 is an enlarged view of one possible transition curve for the lens of FIG. 8 having a first set of multiple radii r1, r2, r3, and a second set of multiple radii with a reverse curve, −r3, −r2, −r1.

The exemplary contact lens of FIG. 8 provides a thicker central region for function and handleability and also provides a reduction in thickness at the peripheral regions beyond the edge of the optical zone for increased comfort as it fits under the eyelids better.

In the embodiment of FIG. 8:

1. The control design has a fixed base curve and a front curve based upon the desired center thickness and desired final power. This design specifies an annulus from point A to point B, FIG. 8.
2. The central thickness design is based upon the same base curve as the control design with a front curve based upon the thick central thickness and desired final power. This design is found in the central region of the lens and extends to point A. The radius of this zone ≠ the radius of the control region.

3. A transition region A–B forms a smooth transition between FC thick and FC thin.

4. The transition zone can be:
   - a straight line;
   - a single bridge radius;
   - multiple radii;
   - an aspherical radius;
   - multiple aspherical radii;
   - any combination of single or multiple spherical and aspheric radii; or
   - multiple radii with a reverse curve, as illustrated in FIG. 9, to minimize discontinuities.

5. In a second design mode, the transition occurs at point A in the bright or midrange pupil diameters (region from approximately 2.75–5.75 mm).

While several embodiments and variations of the present invention for programmable smooth junctions on lenses are described in detail herein, it should be apparent that the disclosure and teachings of the present invention will suggest many alternative designs to those skilled in the art.

What is claimed is:

1. A method of designing a lens which enables a numerically controlled machine to be programmed to machine smooth transitions between adjacent regions of the lens which have different thicknesses or radii of curvature, comprising:

a. defining a first mathematical function f(a) which specifies the curve of a first segment of a lens surface;

b. defining a second mathematical function f(b) which specifies the curve of a second segment of the lens surface;

c. deriving the slope dy/dx of the first mathematical function f(a) at the endpoint of the first segment of the lens surface nearest the second segment;

d. deriving the slope dy/dx of the second mathematical function f(b) at the endpoint of the second segment of the lens surface nearest the first segment;

e. defining a mathematical function which describes a desired transition between the first and second segments of the lens;

f. scaling the x interval between the endpoints of the first and second segments of the lens surface and scaling the y interval between the endpoints of the first and second segments of the lens surface to $\pm 1$ where the midpoint between the endpoints of the first and second segments is defined to be zero; and g. utilizing the first and second mathematical functions f(a) and f(b), the derived slopes dy/dx of the first and second mathematical functions f(a) and f(b), and the mathematical function describing the desired transition to program a numerically controlled machine to machine the first and second segments of the lens surface and the desired transition between the first and second segments.

2. A method of designing a lens as claimed in claim 1, wherein the mathematical function describing the transition describes a linear function.

3. A method of designing a lens as claimed in claim 1, wherein the mathematical function describing the transition describes a single bridge radius.

4. A method of designing a lens as claimed in claim 1, wherein the mathematical function describing the transition describes multiple radii.

5. A method of designing a lens as claimed in claim 1, wherein the mathematical function describing the transition describes an aspheric radius.

6. A method of designing a lens as claimed in claim 1, wherein the mathematical function describing the transition describes multiple aspheric radii.

7. A method of designing a lens as claimed in claim 1, wherein the mathematical function describing the transition describes any combination of single or multiple spheric and aspheric radii.

8. A method of designing a lens as claimed in claim 1, wherein the mathematical function describing the transition describes multiple radii with a reversed curve.

9. A method of designing a lens as claimed in claim 1, wherein a thicker central optical zone of the contact lens is connected to a thinner peripheral lenticular zone of the contact lens with a defined transition curve.

10. A method of designing a lens as claimed in claim 1, wherein the mathematical function describing the transition describes a power function.

11. A method of designing a lens as claimed in claim 1, wherein the mathematical function describing the transition describes an asymptotic connection function.

12. A method of designing a lens as claimed in claim 1, wherein the mathematical function describing the transition describes a trigonometric function.

13. A contact lens produced according to the method of claim 1.

* * * * *

UNITED STATES PATENT AND TRADEMARK OFFICE
CERTIFICATE OF CORRECTION

PATENT NO. : 5,650,838

DATED : July 22, 1997

INVENTOR(S) : Jeffrey H. Roffman et al.

It is certified that error appears in the above-indentified patent and that said Letters Patent is hereby corrected as shown below:

In Figure 8, please replace "CONTROL" with --THIN--.

Signed and Sealed this

Eleventh Day of November, 1997

Attest:

BRUCE LEHMAN

*Attesting Officer*

*Commissioner of Patents and Trademarks*